United States Patent
Van Nieuwenhuyze

(10) Patent No.: US 11,768,968 B2
(45) Date of Patent: Sep. 26, 2023

(54) SECURE STARTING OF AN ELECTRONIC CIRCUIT

(71) Applicant: PROTON WORLD INTERNATIONAL N.V., Diegem (BE)

(72) Inventor: Olivier Van Nieuwenhuyze, Wezembeek-Oppem (BE)

(73) Assignee: PROTON WORLD INTERNATIONAL N.V., Diegem (BE)

(*) Notice: Subject to any disclaimer, the term of this patent is extended or adjusted under 35 U.S.C. 154(b) by 0 days.

(21) Appl. No.: 17/343,146

(22) Filed: Jun. 9, 2021

(65) Prior Publication Data
US 2021/0390214 A1    Dec. 16, 2021

(30) Foreign Application Priority Data

Jun. 10, 2020 (FR) ....................... 2006042

(51) Int. Cl.
*G06F 21/00* (2013.01)
*G06F 21/79* (2013.01)
(Continued)

(52) U.S. Cl.
CPC ............ *G06F 21/79* (2013.01); *G06F 21/575* (2013.01); *G06F 21/64* (2013.01); *G06F 21/72* (2013.01); *G06F 21/107* (2023.08)

(58) Field of Classification Search
CPC ........ G06F 21/79; G06F 21/575; G06F 21/64; G06F 21/72; G06F 2221/0751
See application file for complete search history.

(56) References Cited

U.S. PATENT DOCUMENTS

| 7,690,027 B2 | 3/2010 | Sandberg |
| 7,809,948 B2 | 10/2010 | Lewis et al. |

(Continued)

FOREIGN PATENT DOCUMENTS

| EP | 2 164 017 A2 | 3/2010 |
| FR | 3 043 229 A1 | 5/2017 |

(Continued)

OTHER PUBLICATIONS

Menezes et al., Handbook of Applied Cryptography, CRC Press, Boca Raton, USA, 1996, pp. 489-541, (54 pages).

*Primary Examiner* — Ghazal B Shehni
(74) *Attorney, Agent, or Firm* — SEED INTELLECTUAL PROPERTY LAW GROUP LLP

(57) ABSTRACT

A method of checking the authenticity of at least a first portion of the content of a non-volatile memory of an electronic device including a microcontroller and an embedded secure element is disclosed. The method includes starting the microcontroller with instructions stored in a first secure memory area associated with the microcontroller and starting the secure element. The secure element has a plurality of decipher keys, each associated with a portion of the content of a second reprogrammable non-volatile memory area associated with the microcontroller. The secure element performs a signature check on a first portion of the content of the second area. If the signature is verified, the secure element sends the decipher key associated with the first portion to the microcontroller. If the signature is not verified, the secure element executes a signature check on another portion of the content of the second memory area.

32 Claims, 2 Drawing Sheets

(51) Int. Cl.
*G06F 21/57* (2013.01)
*G06F 21/64* (2013.01)
*G06F 21/72* (2013.01)
*G06F 21/10* (2013.01)

(56) References Cited

U.S. PATENT DOCUMENTS

| | | |
|---|---|---|
| 8,332,653 B2 | 12/2012 | Buer |
| 9,568,983 B1 | 2/2017 | Lachwani |
| 9,626,512 B1 | 4/2017 | Brandwine et al. |
| 9,946,899 B1 | 4/2018 | Wesson et al. |
| 10,084,603 B2 | 9/2018 | Rogers et al. |
| 10,157,281 B2 | 12/2018 | Van Nieuwenhuyze et al. |
| 10,211,985 B1 | 2/2019 | Brandwine et al. |
| 10,243,739 B1 | 3/2019 | Brandwine et al. |
| 10,275,599 B2 | 4/2019 | Collart et al. |
| 10,733,284 B2 | 8/2020 | Broumas et al. |
| 2003/0120922 A1 | 6/2003 | Sun et al. |
| 2004/0243801 A1 | 12/2004 | Chen et al. |
| 2005/0076226 A1 | 4/2005 | Boivie et al. |
| 2005/0081040 A1 | 4/2005 | Johnson et al. |
| 2005/0132217 A1 | 6/2005 | Srinivasan et al. |
| 2008/0148036 A1 | 6/2008 | Westerinen et al. |
| 2009/0259854 A1 | 10/2009 | Cox et al. |
| 2009/0265536 A1 | 10/2009 | Filee et al. |
| 2012/0060039 A1 | 3/2012 | Leclercq |
| 2012/0272071 A1 | 10/2012 | Muir |
| 2013/0223623 A1 | 8/2013 | Jooste et al. |
| 2014/0082373 A1* | 3/2014 | Colnot ............... G06F 21/575 713/193 |
| 2014/0205092 A1 | 7/2014 | Hartley et al. |
| 2015/0089214 A1 | 3/2015 | Dupré |
| 2015/0095644 A1 | 4/2015 | Gupta et al. |
| 2015/0242620 A1* | 8/2015 | Newell ............... G06F 21/76 726/30 |
| 2016/0055113 A1 | 2/2016 | Hodge et al. |
| 2016/0171223 A1 | 6/2016 | Covey et al. |
| 2017/0124330 A1* | 5/2017 | Van Nieuwenhuyze ............... G06F 21/81 |
| 2017/0291593 A1 | 10/2017 | Iwagami et al. |
| 2019/0073480 A1 | 3/2019 | Van Nieuwenhuyze |
| 2019/0087584 A1 | 3/2019 | Van Nieuwenhuyze |
| 2020/0184078 A1 | 6/2020 | Hinrichs et al. |

FOREIGN PATENT DOCUMENTS

| | | |
|---|---|---|
| JP | 2000138917 A | 5/2000 |
| JP | 2001318787 A | 11/2001 |

* cited by examiner

SECURE STARTING OF AN ELECTRONIC CIRCUIT

BACKGROUND

Technical Field

The present disclosure generally relates to electronic circuits and, more particularly, to devices comprising a processor and an embedded secure element. The present disclosure more particularly applies to controlling the authenticity of all or part of a code or of firmware comprising a set of instructions executed by the processor at the starting of the device.

Description of the Related Art

Many electronic devices, for example, cell phones, electronic keys (dongles), etc., are equipped with microprocessors for processing data and executing various applications. Among such applications, some are now associated with operations requiring preserving the security of the exchanged data, for example, payment, access control operations, etc.

Larger devices, for example, computers, video decoding boxes (Set Top Box), etc., comprise trusted platform modules (TPM) which enable to protect the content of instruction memories and in particular to check that a code or program to be executed has not been corrupted. Such modules are lacking in less elaborate devices such as, for example, cell phones, electronic keys, and connected objects (connected watch, access dongle, etc.).

Electronic devices, even if they comprise no secure platform module, are however more and more often equipped with embedded secure elements, which actually are integrated circuits representing the security functions of microcircuit cards (smartcard, SIM, etc.). For example, such secure elements may contain the microcircuit card emulation application which provides the security authentication service for payment, access control, etc., operations.

BRIEF SUMMARY

An embodiment facilitates securing the starting of an electronic device to control that the code or the data that it contains are authentic or non-corrupted.

An embodiment facilitates the starting of an electronic device capable of implementing a plurality of operating systems to control and/or manage which operating system has been started.

An embodiment facilitates securing the starting of an electronic device capable of implementing a plurality of operating systems to control whether the code or the data associated with the operating system that it implements are authentic or non-corrupted.

An embodiment provides protecting an embedded secure element associated with a microprocessor in an electronic device.

An embodiment provides a method of checking the authenticity of at least a first portion of the content of a non-volatile memory of an electronic device comprising a microcontroller and an embedded secure element, comprising the steps of:

starting the microcontroller with instructions stored in a first secure memory area associated with the microcontroller;

starting the secure element, the secure element comprising a plurality of decipher keys, each associated with the content of a second reprogrammable non-volatile memory area associated with the microcontroller;

executing, with the secure element, a signature check on a first portion of the content of the second area;

if the signature is verified, the secure element sends the decipher key associated with said first portion to the microcontroller; and if the signature is not verified, the secure element executes a signature check on another portion of the content of said second memory area.

According to an embodiment, each portion of the content of the second non-volatile memory area comprises data and instructions enabling the microcontroller to implement a different operating system.

According to an embodiment, the microcontroller is capable of implementing at least three operating systems.

According to an embodiment, if no signature is verified, the secure element sends data to the microcontroller.

According to an embodiment, said data comprise a decipher key capable of deciphering no portion of the content of said second non-volatile memory area.

According to an embodiment, said data comprise data and instructions enabling the microcontroller to implement a new operating system, such as an operating system not previously stored in the memory of the microcontroller.

According to an embodiment, said new operating system is an operating system enabling to:

restart the microcontroller;

initiate a diagnosis of the microcontroller;

update one or a plurality of operating systems that the microcontroller is capable of implementing; or reset the microcontroller.

According to an embodiment, the microcontroller generates a second key, transmits it to the secure element which uses it to cipher the transmission of the first key to the microcontroller.

According to an embodiment, the transmission of the second key uses a public key asymmetric algorithm.

According to an embodiment, the asymmetric cipher key is unique per microcontroller/secure element pair.

According to an embodiment, the first key is not stored in the non-volatile memory in the microcontroller.

According to an embodiment, in case of an authentic update of at least a portion of the content of the second area, the signature associated with said portion stored in the secure element is accordingly modified.

According to an embodiment, the first key is generated by the secure element.

According to an embodiment, if the signature is not verified, the secure element selects another portion of the content of said second memory area that it checks.

According to an embodiment, the secure element may select another portion of the content of said second memory area based on an instruction received during a previous implementation of a portion of the content of the second memory area.

Another embodiment provides an electronic device comprising:

a microcontroller; and an embedded secure element, the microcontroller and the secure element being capable of implementing one or more of the methods disclosed herein.

According to an embodiment, one or more intermediate circuits are interposed between the microcontroller and the secure element.

In an embodiment, a method comprises: starting a microcontroller of an electronic device with instructions stored in a first secure memory area associated with the microcontroller; starting a secure element of the electronic device, the secure element having a plurality of decipher keys, each associated with a portion of a plurality of portions of content of a second reprogrammable non-volatile memory area associated with the microcontroller; executing, with the secure element, a signature check on a first portion of the plurality of portions of content of the second area; in response to the signature check verifying the first portion of the content of the second area, sending, by the secure element, the decipher key associated with the first portion to the microcontroller; and in response to the signature check not verifying the first portion of the content of the second area, executing, by the secure element, a signature check of another portion of the plurality of portions of content of the second memory area. In an embodiment, each portion of the plurality of portions of content of the second memory area stores data and instructions to implement a respective one of a plurality of operating systems. In an embodiment, the plurality of portions of the second memory area comprise three or more portions. In an embodiment, the method comprises responding, by the secure element, to a failure of verification of each of the plurality of portions by sending data to the microcontroller. In an embodiment, the data comprises a dummy decipher key. In an embodiment, the data comprises data and instructions to cause the microcontroller to implement an operating system other than one of the plurality of operating systems. In an embodiment, the operating system other than one of the plurality of operation systems is an operating system to: restart the microcontroller; initiate a diagnosis of the microcontroller; update one or more of the plurality of operating systems; reset the microcontroller; or various combinations thereof. In an embodiment, the microcontroller generates a second key and transmits the second key to the secure element, which uses the second key to cipher the transmission of the first key to the microcontroller. In an embodiment, the transmission of the second key uses a public key asymmetric algorithm. In an embodiment, an asymmetric cipher key is unique per microcontroller/secure element pair. In an embodiment, the first key is not stored in the non-volatile memory in the microcontroller. In an embodiment, the method comprises, in response to an authentic update of a portion of the content of the second area, modifying the signature associated with the portion stored in the secure element. In an embodiment, the first key is generated by the secure element. In an embodiment, the method comprises, in response to the signature check not verifying the first portion of the content of the second area, selecting, by the secure element, the another portion of the plurality of portions of content of the second memory area to check. In an embodiment, the secure element selects the another portion of the content of the second memory area based on an instruction received during a previous implementation of a portion of the content of the second memory area.

In an embodiment, an electronic device comprises: a microcontroller associated with a first secure memory area and a second reprogrammable non-volatile memory area, the second reprogrammable memory area having a plurality of portions; and an embedded secure element coupled to the microcontroller, the embedded secure element having a plurality of decipher keys each associated with a respective portion of the plurality of portions of the second reprogrammable memory area, wherein the embedded secure element, in operation: executes a signature check on a first portion of the plurality of portions of content of the second area; in response to the signature check verifying the first portion of the content of the second area, sends the decipher key associated with the first portion to the microcontroller; and in response to the signature check not verifying the first portion of the content of the second area, executes a signature check of another portion of the plurality of portions of content of the second memory area. In an embodiment, each portion of the plurality of portions of content of the second non-volatile memory area stores data and instructions to implement a respective one of a plurality of operating systems on the microcontroller. In an embodiment, the secure element, in operation, responds to a failure of verification of each of the plurality of portions by sending data to the microcontroller. In an embodiment, the data comprises data and instructions to cause the microcontroller to implement an operating system other than one of the plurality of operating systems. In an embodiment, the operating system other than one of the plurality of operation systems, when executed by the microcontroller: restarts the microcontroller; initiates a diagnosis of the microcontroller; updates one or more of the plurality of operating systems; resets the microcontroller; or various combinations thereof. In an embodiment, the microcontroller, in operation, generates a second key and transmits the second key to the secure element, and the secure element, in operation, uses the second key to cipher the transmission of the first key to the microcontroller. In an embodiment, the transmission of the second key uses a public key asymmetric algorithm. In an embodiment, the electronic device comprises an intermediate circuit coupled between the microcontroller and the secure element.

In an embodiment, a system comprises: a memory; a microcontroller coupled to the memory, the microcontroller having an associated first secure memory area and an associated second reprogrammable non-volatile memory area, the second reprogrammable memory area having a plurality of portions; and an embedded secure element coupled to the microcontroller, the embedded secure element having a plurality of decipher keys each associated with a respective portion of the plurality of portions of the second reprogrammable memory area, wherein the embedded secure element, in operation: executes a signature check on a first portion of the plurality of portions of content of the second area; in response to the signature check verifying the first portion of the content of the second area, sends the decipher key associated with the first portion to the microcontroller; and in response to the signature check not verifying the first portion of the content of the second area, executes a signature check of another portion of the plurality of portions of content of the second memory area. In an embodiment, in operation, each portion of the plurality of portions of content of the second non-volatile memory area stores data and instructions to implement a respective one of a plurality of operating systems on the microcontroller. In an embodiment, the secure element, in operation, responds to a failure of verification of each of the plurality of portions by sending data and instructions to the cause the microcontroller to implement an operating system other than one of the plurality of operating systems. In an embodiment, the first secure memory area is integrated into the microcontroller and the second reprogrammable memory area is integrated into the memory.

In an embodiment, a non-transitory computer-readable medium's contents which cause an electronic device to perform a method, the method comprising: starting a microcontroller of the electronic device; starting a secure element of the electronic device, the secure element having a plurality of decipher keys, each associated with a portion of a plurality of portions of content of a reprogrammable non-volatile memory area associated with the microcontroller; executing, with the secure element, a signature check on a first portion of the plurality of portions of content of the reprogrammable non-volatile memory area; in response to the signature check verifying the first portion of the content, sending, by the secure element, the decipher key associated with the first portion to the microcontroller; and in response to the signature check not verifying the first portion of the content, executing, by the secure element, a signature check of another portion of the plurality of portions of content. In an embodiment, each portion of the plurality of portions of content stores data and instructions to implement a respective one of a plurality of operating systems. In an embodiment, the method comprises responding, by the secure element, to a failure of verification of each of the plurality of portions by sending data to the microcontroller. In an embodiment, the data comprises data and instructions to cause the microcontroller to implement an operating system other than one of the plurality of operating systems. In an embodiment, the contents comprise instructions stored in a secure memory area associated with the microcontroller.

BRIEF DESCRIPTION OF THE SEVERAL VIEWS OF THE DRAWINGS

The foregoing example features and advantages, as well as others, will be described in detail in the following description of specific embodiments given by way of illustration and not limitation with reference to the accompanying drawings, in which.

DETAILED DESCRIPTION

Like features have been designated by like references in the various figures unless the context indicates otherwise. In particular, the structural and/or functional features that are common among the various embodiments may have the same references and may dispose similar or identical structural, dimensional and material properties.

For the sake of clarity, only the steps and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless specified otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, or within 5%.

Figure 1:
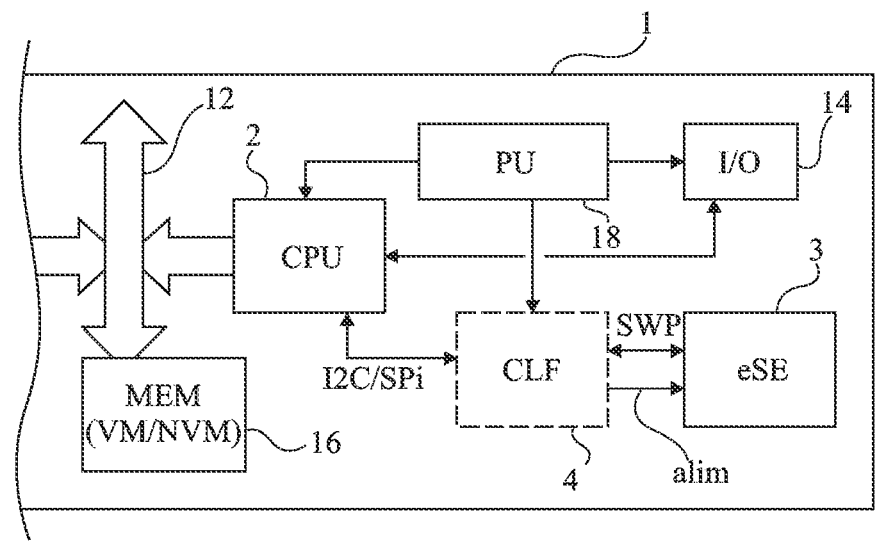
FIG. 1 very schematically shows in the form of blocks an embodiment of an electronic device equipped with a microcontroller and with a secure element.

FIG. 1 very schematically shows, in the form of blocks, an example of an electronic device 1 of the type to which example embodiments which will be described may apply.

Device 1, for example, a cell phone, an electronic key, etc., comprises a microcontroller 2 (CPU—Central Processing Unit or processing core) in charge of executing all or part of the programs and applications implemented in the device. Microcontroller 2 communicates, via one or a plurality of address, data, and control buses 12, with different electronic circuits and peripherals (not shown) of device 1, for example, display control circuits, of a keyboard, etc., as well as with various wired or wireless input-output interfaces 14 (I/O) (for example, Bluetooth). Microcontroller 2 generally integrates volatile and non-volatile memories and also processes the content of similar memories 16 (MEM (VM/NVM)) of device 1. Microcontroller 2 is capable of implementing a plurality of operating systems, or low-level firmware. As an example, a first operating system may be a primary operating system, a second operating system may be an update operating system, a third operating system may be a data recovery operating system. According to another example, microcontroller 2 is capable of implementing a plurality of primary operating systems, such as for example the primary operating system of a telephone and the operating system of a transport card or of a bank card. Microcontroller 2 and various circuits of device 1 are powered by a power unit 18 (PU). For example, unit 18 is a battery, possibly associated with a voltage regulator.

In applications targeted by the present disclosure, device 1 comprises an embedded secure element 3 (for example, eSE—embedded Secure element or eUICC—embedded Universal Integrated Circuit Card) which includes a secure microprocessor or processing core. Element 3 is intended to contain secure services or applications of the electronic device, for example, payment, access control, and other applications.

Possibly, an intermediate element or circuit 4, for example, a near-field communication controller 4 (NFC), also called contactless front end (CLF), a Bluetooth controller, etc., equips device 1. Element 4 (illustrated in dotted lines in FIG. 1) is capable of being used by microcontroller 2, for example by connections of twin-wire type (I2C or SPI) and, by element 3, by a connection of single-wire type (SWP—Single Wire Protocol).

According to the voltage level supported by secure element 3, said element is either powered by unit 18 or, as shown in FIG. 1, by element 4, which is itself powered by unit 18. For example, the case of a microcontroller 2 and of a contactless communication controller 4, powered under a voltage in the order of 3 volts by unit 18 and of an element 3 powered under a voltage in the order of 1.8 volt (alim) by controller 4 can be considered. The need for a power supply by NFC controller 4 may be due to the levels used by the communication protocols between the controller and secure element 3. According to a variant, contactless communication controller 4 is absent, secure element 3 is, in this case, directly connected to microcontroller 2 and is directly powered by unit 18.

It is provided to take advantage of the presence of embedded secure element 3 to manage which operating system is executed by microcontroller 2.

It is further provided to take advantage of the presence of embedded secure element 3 to check the authenticity of the content (data, instructions, etc.) of all or part of the memories associated with microcontroller 2. More particularly, it is provided to take advantage of the presence of secure element 3 to check the authenticity of the data and instructions associated with each operating system capable of being implemented by microcontroller 2 before its implementation.

Figure 2:
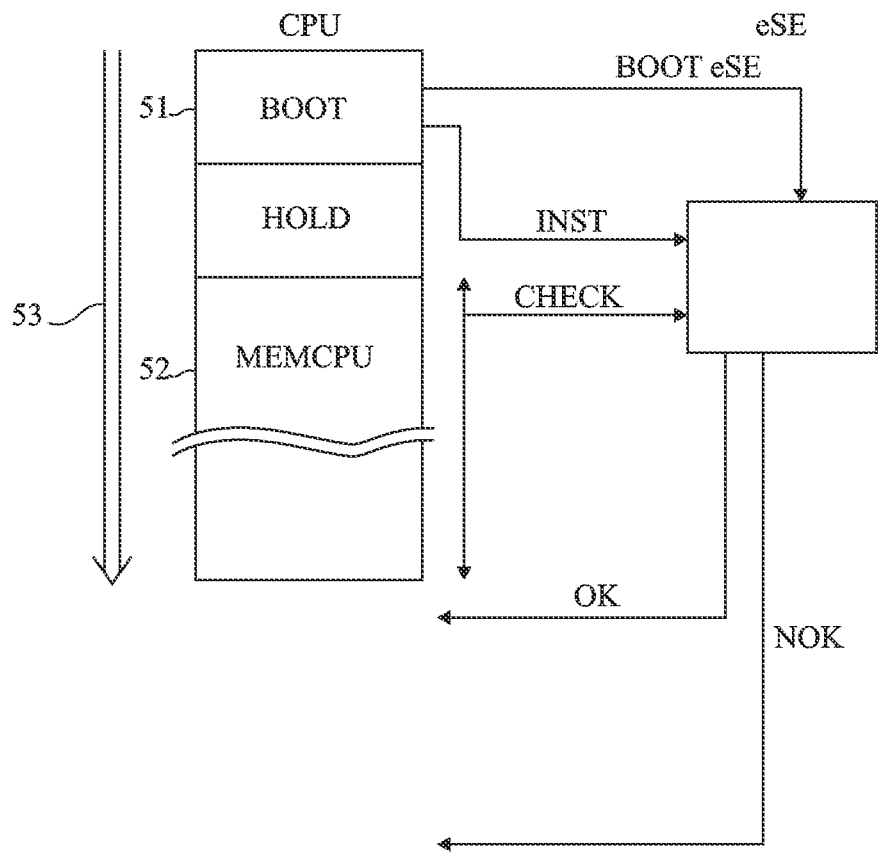
FIG. 2 very schematically shows in the form of blocks an embodiment of a start-up sequence of the microcontroller of the electronic device of FIG. 1.

FIG. 2 is a simplified representation illustrating an embodiment of a start-up sequence of microcontroller 2 of electronic device 1 of FIG. 1.

Risks inherent to the starting of microcontroller 2 in terms of data security are that, in case of a piracy, data or instructions of the embedded secure element can be pirated. This risk occurs at the start, called cold boot, which follows a powering-on since not all the mechanisms for controlling the access to the different circuits have been initialized yet such as, in particular, the configuration of the memories in free areas and reserved areas. The problem is not as serious in the case of a "hot" reset of the device, that is, with no interruption of the microcontroller power supply, since such memory area configuration mechanisms are generally untouched. However, the described embodiment may also be implemented in case of a partial or total deleting of the memory in a reset operation.

At a starting (powering-on of the electronic circuits of the device) or a reset with an interruption of the power supply, microcontroller 2 starts by accessing a set area 51 (BOOT) of its non-volatile memory containing a code (a start-up program). Area 51 is generally a dead memory area, that is, non-volatile and non-reprogrammable (sometimes called "immutable"). According to a variant, area 51 may be a limited or restricted secure write area of a non-volatile or volatile memory. It is thus set on manufacturing and does not risk being modified by a possible pirate. In fact, the memory area (MEMCPU) 52 to be protected is a non-volatile memory area which will be operated by microcontroller 2, on implementation of the operating systems. Such an area 52 generally contains code (instructions) and data, which are reprogrammable according to applications. If a pirate succeeds in storing an attack code in these areas, he/she risks being able to access secure element 3, and would then be able to modify the behavior of device 1, collect confidential data and information directly manipulated by the operating system to supply them, for example, to a pirate application implemented by the operating system. In the rest of the description, it is considered that area 52 of the non-volatile memory of microcontroller 2 is divided into a plurality of portions, each comprising data and instructions relative to an operating system. More particularly, the data and instructions relative to an operating system are all ciphered with one or a plurality of cipher keys. Each operating system has its own cipher key(s) different from the cipher keys of the other operating systems.

According to an embodiment, the start-up code 51 executed by the microcontroller contain an instruction for starting secure element 3 (eSE) as well as, subsequently in the sequencing of the initialization process (illustrated by an arrow 53), an instruction INST for starting a process of checking of a portion of area 52 by element 3. Once instruction INST has been communicated by microcontroller 2 to element 3, microcontroller 2 sets to a hold mode (HOLD) where it waits for a response from secure element 3. As long as it does not receive this response, it does not carry on the execution of the code that it contains. According to a variant, secure element 3 can start by itself when it is powered on, for example, at the same time as microcontroller 2.

The checking CHECK performed by element 3 comprises reading a first portion of area 52 storing the data relative to a first operating system and executing an authenticity check mechanism on said portion. For example, this mechanism is a signature calculation based on the code and data contained in the first portion of area 52, for checking this signature against a reference signature stored in element 3. In this case, in case of an authorized modification of the content of area 52, the reference signature stored in element 3 is updated to allow subsequent authenticity checks.

In other words, checking CHECK comprises performing a signature calculation from the code and the data relative to an operating system each time the operating system requests being implemented. In other words, the checking enables to check whether the data relative to the operating system are not corrupted.

Further, all the data relative to the operating systems are ciphered. More particularly, each set of data relative to an operating system is ciphered by using at least one same cipher key different from at least another cipher key of another set of data relative to another operating system. The corresponding decipher keys are all stored in secure element 3.

If element 3 validates the authenticity of the content of the portion of area 52, it responds (OK) to microcontroller 2 and sends thereto the cipher key associated with the data of area 52 which have just been checked. Microcontroller 2 can then leave its hold mode and execute the operating system associated with these data.

However, if element 3 does not validate (NOK) the content of the first portion of area 52, it sends an instruction to the microcontroller indicating that the first operating system cannot be implemented. Element 3 then requests to receive the data and instructions from another portion of area 52 in order to authenticate another operating system. If all the operating systems of the microcontroller are corrupted, then element 3 can send back data or an instruction to the microcontroller, for example, a null decipher key, or a microcontroller default instruction. Element 3 may further send a series of data and instructions relative to a new operating system to microcontroller 2. According to an example, the new operating system may allow a restarting or a resetting of microcontroller 2 or of device 1. According to another example, the new operating system may for example be a diagnosis operating system enabling to perform tests on the operation of the microcontroller or even of the complete device 1. According to still another example, the new operating system may be an operating system for updating the operating systems of microcontroller 2.

Figure 3:
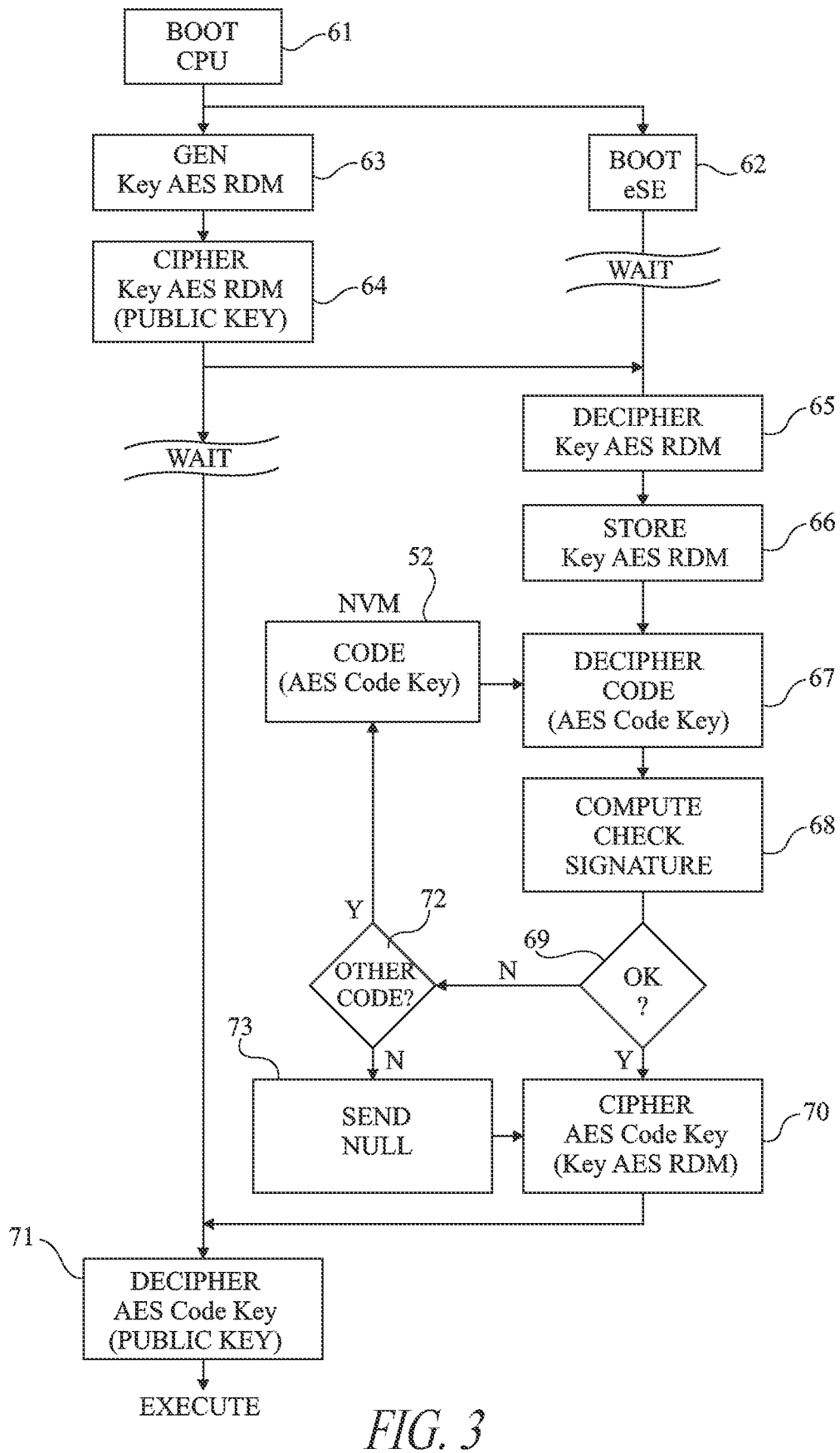
FIG. 3 shows in the form of a flowchart another embodiment of a start-up sequence of the microcontroller of the electronic device of FIG. 1.

FIG. 3 is a simplified representation illustrating in further detail an embodiment of the start-up sequence of the microcontroller of the electronic device of FIG. 1.

According to this embodiment, the method is performed by exchange of messages between microcontroller 2 and secure element 3.

The starting of microcontroller 2 (block 61, BOOT CPU) causes the starting (block 62, BOOT eSE) of secure element 3. Once started, element 3 waits for instructions (WAIT).

Further, the checking of the content of the different portions of area 52 or of the non-volatile memory areas (NVM) containing code to be checked is also performed, for example, by a signature check by element 3.

According to an embodiment, the code and the fixed data, stored in non-volatile memory 52 and forming the initialization data of microcontroller 2 after the starting thereof, are ciphered. The ciphering used is for example a symmetrical AES-type ciphering. However, instead of being stored in microcontroller 2, the cipher key(s) are stored in secure element 3.

Once microcontroller 2 has started (end of block 61) and it has given a start instruction to element 3, it generates a key (block 63, GEN KeyAESRDM), for example a random number of the size of the AES used to cipher the code.

Microcontroller 2 then transmits key KeyAESRDM to the secure element. Such a transmission may be performed by a public key mechanism, the microcontroller ciphering key KeyAESRDM with the public key of the algorithm (block 64, CIPHER KeyAESRDM (PUBLIC KEY)). In an embodiment, microcontroller 2 does not store random number KeyAESRDM in a non-volatile memory. Indeed, it is sufficient for it to store this number in a volatile memory, which decreases risks of attack. Once key KeyAESRDM has been transmitted, the microcontroller sets to the waiting mode (WAIT).

Element 3 deciphers KeyAESRDM by means of the public key mechanism (block 65, DECIPHER KeyAESRDM)) and stores it (block 66, STORE KeyAESRDM).

Element 3 then deciphers (block 67, DECIPHER CODE (AESCodeKey) the code contained in the portion of area 52 of the non-volatile memory of microcontroller 2 (or associated therewith) relative to the operating system to be implemented. Element 3 calculates and checks (block 68, COMPUTE/CHECK SIGNATURE) the signature of this code.

If the signature is correct (output Y of block 69), element 3 ciphers decipher key AESCodeKey, corresponding to the data which have just been checked, with key KeyAESRDM (block 70, CIPHER AESCodeKey (KeyAESRDM)) and sends it to microcontroller 2. The latter deciphers key AESCodeKey (block 71, DECIPHER AESCodeKey (PUBLIC KEY)) with key KeyAESRDM. As previously mentioned, element 3 stores a plurality of decipher keys AESCodeKey, each associated with all or part of the data relative to an operating system.

Microcontroller 2 then uses key AESCodeKey to decipher the code contained in the portion of area 52, that is, the data which have just been checked by secure element 3, and to execute it (EXECUTE). However, key AESCodeKey is not stored in the non-volatile memory by microcontroller 2. Thus, on the side of microcontroller 2, number KeyAESRDM and key AESCodeKey are only stored in volatile storage elements (RAM, registers, or the like).

If the signature is incorrect (output N of block 69, OK?), element 3 requests to examine the next portion of area 52 (block 72, OTHER CODE?), that is, the data and instructions relative to another operating system implemented by microcontroller 2. Thus, the data and instructions relative to the first operating system are not deciphered, and thus cannot be used by microcontroller 2.

If the data and instructions relative to another operating system have not been checked yet (output Y of block 72), then the data relative to this other operating system are sent to element 3 (block 52) and their signature is checked (block 67).

If all the data and instructions relative to the other operating systems have already been checked and are considered as corrupted (output N of block 72), then element 3 sends data or an instruction to the microcontroller (block 73, SEND NULL), for example, a null decipher key, or a default instruction regarding microcontroller 2. Element 3 may further send a series of data and instructions relative to a new operating system to microcontroller 2. According to an example, the new operating system may allow a restarting or a resetting of microcontroller 2 or of device 1. According to another example, the new operating system may for example be a diagnosis operating system enabling to perform tests on the operation of microcontroller 2 or even of the complete device 1. According to still another example, the new operating system may be an operating system for updating the operating systems of microcontroller 2.

The data or instruction sent by element 3, or possibly the series of data and of instructions, are ciphered with key KeyAESRDM (block 70) before their sending to microcontroller 2. Microcontroller 2 deciphers them (block 71) and then uses them.

According to an alternative embodiment, key AESCodeKey is generated by secure element 3 for each change of signature of the code contained in area 52, that is, each time all or part of the code is modified.

According to another variant, on manufacturing of the circuits (of microcontroller 2 and of secure element 3), the cipher code of memory 52 of the microcontroller is generated by secure element 3. This means that code AESCodeKey varies from one device 1 to another.

In an embodiment, the asymmetric key (pair of public and private key) is unique per pair of microcontroller component 2/secure element 3.

According to another variant, security element 3 may select which operating system is to be implemented by microcontroller 2.

According to another variant, the security element may check all the operating systems before deciding which operating system should be implemented.

According to another variant, on update of an operating system, the decipher key stored in the secure element 3 which is associated therewith may be modified.

According to another variant, secure element 3 may be in charge of deciding which operating system should be implemented. It may for example decide which operating system should be started after having determined that data relative to a first operating system are corrupted. It may for example decide to start another operating system having the function of updating said first operating system. More particularly, secure element 3 could load another operating system capable of implementing the data of microcontroller 2. To make this choice, the secure element could receive a secure instruction indicating thereto the procedure to follow before the checking of the data, for example, during a previous implementation of one of the operating systems. As a variant, secure element 3 could start the operating system even before the checking of the data relative to the operating systems if it has received the order during a directly previous implementation of another operating system.

Various embodiments and variants have been described. Those skilled in the art will understand that certain features of these various embodiments and variants may be combined, and other variants will occur to those skilled in the art.

Finally, the practical implementation of the described embodiments and variations is within the abilities of those skilled in the art based on the functional indications given hereabove.

Such alterations, modifications, and improvements are intended to be part of this disclosure, and are intended to be within the spirit and the scope of the present disclosure. Accordingly, the foregoing description is by way of example only and is not intended to be limiting.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    starting a microcontroller of an electronic device with instructions stored in a first secure memory area associated with the microcontroller;
    starting a secure element of the electronic device, the secure element having a plurality of decipher keys, each associated with a portion of a plurality of portions of content of a second reprogrammable non-volatile memory area associated with the microcontroller, wherein each portion of the plurality of portions of content of the second reprogrammable non-volatile memory area stores data and instructions to implement a respective one of a plurality of different operating systems;
    executing, with the secure element, a signature check on a first portion of the plurality of portions of content of the second reprogrammable non-volatile memory area, the first portion storing data and instructions to implement a first operating system of the plurality of operating systems;
    in response to the signature check verifying the first portion of the content of the second reprogrammable non-volatile memory area, sending, by the secure element, the decipher key associated with the first portion to the microcontroller; and
    in response to the signature check not verifying the first portion of the content of the second reprogrammable non-volatile memory area, executing, by the secure element, a signature check of a second portion of the plurality of portions of content of the second reprogrammable non-volatile memory area, the second portion storing data and instructions to implement a second operating system of the plurality of operating systems.

2. The method according to claim 1, wherein the plurality of portions of the second reprogrammable non-volatile memory area comprises three or more portions.

3. The method according to claim 1, comprising responding, by the secure element, to a failure of verification of each of the plurality of portions by sending data to the microcontroller.

4. The method according to claim 3, wherein the data comprises a dummy decipher key.

5. The method according to claim 3, wherein the data comprises data and instructions to cause the microcontroller to implement an operating system other than one of the plurality of operating systems.

6. The method according to claim 5, wherein the operating system other than one of the plurality of operating systems is an operating system to:
    restart the microcontroller;
    initiate a diagnosis of the microcontroller;
    update one or more of the plurality of operating systems;
    reset the microcontroller; or
    various combinations thereof.

7. The method according to claim 1, wherein the microcontroller generates a second key, transmits the second key to the secure element which uses the second key to cipher the transmission of the first key to the microcontroller.

8. The method according to claim 7, wherein the transmission of the second key uses a public key asymmetric algorithm.

9. The method according to claim 8, wherein an asymmetric cipher key is unique per microcontroller/secure element pair.

10. The method according to claim 1, wherein the first key is not stored in the non-volatile memory in the microcontroller.

11. The method according to claim 1, wherein in response to an authentic update of a portion of the content of the second reprogrammable non-volatile memory area, the signature associated with the portion stored in the secure element is modified.

12. The method according to claim 1, wherein the first key is generated by the secure element.

13. The method according to claim 1, wherein, in response to the signature check not verifying the first portion of the content of the second reprogrammable non-volatile memory area, the secure element selects the second portion of the plurality of portions of content of the second reprogrammable non-volatile memory area to check.

14. The method according to claim 13, wherein the secure element selects the second portion of the content of the second reprogrammable non-volatile memory area based on an instruction received during a previous implementation of a portion of the content of the second reprogrammable non-volatile memory area.

15. An electronic device, comprising:
    a microcontroller associated with a first secure memory area and a second reprogrammable non-volatile memory area, the second reprogrammable non-volatile memory area having a plurality of portions; and
    an embedded secure element coupled to the microcontroller, the embedded secure element having a plurality of decipher keys each associated with a respective portion of the plurality of portions of the second reprogrammable non-volatile memory area, wherein each portion of the plurality of portions of content of the second reprogrammable non-volatile memory area stores data and instructions to implement a respective one of a plurality of different operating systems on the microcontroller, wherein the embedded secure element, in operation:
  executes a signature check on a first portion of the plurality of portions of content of the second reprogrammable non-volatile memory area, the first portion storing data and instructions to implement a first operating system of the plurality of operating systems;
  in response to the signature check verifying the first portion of the content of the second reprogrammable non-volatile memory area, sends the decipher key associated with the first portion to the microcontroller; and
  in response to the signature check not verifying the first portion of the content of the second reprogrammable non-volatile memory area, executes a signature check of a second portion of the plurality of portions of content of the second reprogrammable non-volatile memory area, the second portion storing data and instructions to implement a second operating system of the plurality of operating.

16. The electronic device of claim 15, wherein, in response to the signature check not verifying the first portion of the content of the second reprogrammable non-volatile memory area, the secure element selects the second portion of the plurality of portions of content of the second reprogrammable non-volatile memory area to check.

17. The electronic device of claim 16, wherein the secure element, in operation, responds to a failure of verification of each of the plurality of portions by sending data to the microcontroller.

18. The electronic device of claim 17, wherein the data comprises data and instructions to cause the microcontroller to implement an operating system other than one of the plurality of operating systems.

19. The electronic device of claim 18, wherein the operating system other than one of the plurality of operating systems, when executed by the microcontroller:
  restarts the microcontroller;
  initiates a diagnosis of the microcontroller;
  updates one or more of the plurality of operating systems;
  resets the microcontroller; or
  various combinations thereof.

20. The electronic device of claim 16, wherein the secure element selects the second portion of the content of the second reprogrammable non-volatile memory area based on an instruction received during a previous implementation of a portion of the content of the second reprogrammable non-volatile memory area.

21. The electronic device of claim 15, wherein the microcontroller, in operation, generates a second key and transmits the second key to the secure element, and the secure element, in operation, uses the second key to cipher the transmission of the first key to the microcontroller.

22. The electronic device of claim 21, wherein the transmission of the second key uses a public key asymmetric algorithm.

23. The electronic device of claim 15, comprising an intermediate circuit coupled between the microcontroller and the secure element.

24. A system, comprising:
a memory;
a microcontroller coupled to the memory, the microcontroller having an associated first secure memory area and an associated second reprogrammable non-volatile memory area, the second reprogrammable non-volatile memory area having a plurality of portions, each portion of the plurality of portions of content of the second reprogrammable non-volatile memory area stores data and instructions to implement a respective one of a plurality of different operating systems on the microcontroller; and
an embedded secure element coupled to the microcontroller, the embedded secure element having a plurality of decipher keys each associated with a respective portion of the plurality of portions of the second reprogrammable non-volatile memory area, wherein the embedded secure element, in operation:
  executes a signature check on a first portion of the plurality of portions of content of the second reprogrammable non-volatile memory area, the first portion storing data and instructions to implement a first operating system of the plurality of operating systems;
  in response to the signature check verifying the first portion of the content of the second reprogrammable non-volatile memory area, sends the decipher key associated with the first portion to the microcontroller; and
  in response to the signature check not verifying the first portion of the content of the second reprogrammable non-volatile memory area, executes a signature check of a second portion of the plurality of portions of content of the second reprogrammable non-volatile memory area, the second portion storing data and instructions to implement a second operating system of the plurality of operating systems.

25. The system of claim 24, wherein, in response to the signature check not verifying the first portion of the content of the second reprogrammable non-volatile memory area, the secure element selects the second portion of the plurality of portions of content of the second reprogrammable non-volatile memory area to check.

26. The system of claim 25, wherein the secure element, in operation, responds to a failure of verification of each of the plurality of portions by sending data and instructions to cause the microcontroller to implement an operating system other than one of the plurality of operating systems.

27. The system of claim 24, wherein the first secure memory area is integrated into the microcontroller and the second reprogrammable non-volatile memory area is integrated into the memory.

28. A non-transitory computer-readable medium having contents which cause an electronic device to perform a method, the method comprising:
  starting a microcontroller of the electronic device;
  starting a secure element of the electronic device, the secure element having a plurality of decipher keys, each associated with a portion of a plurality of portions of content of a reprogrammable non-volatile memory area associated with the microcontroller, wherein each portion of the plurality of portions of content stores data and instructions to implement a respective one of a plurality of different operating systems;
  executing, with the secure element, a signature check on a first portion of the plurality of portions of content of the reprogrammable non-volatile memory area;

in response to the signature check verifying the first portion of the content, sending, by the secure element, the decipher key associated with the first portion to the microcontroller, the first portion storing data and instructions to implement a first operating system of the plurality of operating systems; and in response to the signature check not verifying the first portion of the content, executing, by the secure element, a signature check of a second portion of the plurality of portions of content, the second portion storing data and instructions to implement a second operating system of the plurality of operating systems.

29. The non-transitory computer-readable medium of claim 28, wherein, in response to the signature check not verifying the first portion of the content, the secure element selects the second portion of the plurality of portions of content to check.

30. The non-transitory computer-readable medium of claim 29, wherein the method comprises responding, by the secure element, to a failure of verification of each of the plurality of portions by sending data to the microcontroller.

31. The non-transitory computer-readable medium of claim 30 wherein the data comprises data and instructions to cause the microcontroller to implement an operating system other than one of the plurality of operating systems.

32. The non-transitory computer-readable medium of claim 28, wherein the contents comprise instructions stored in a secure memory area associated with the microcontroller.

* * * * *

UNITED STATES PATENT AND TRADEMARK OFFICE
CERTIFICATE OF CORRECTION

PATENT NO. : 11,768,968 B2  
APPLICATION NO. : 17/343146  
DATED : September 26, 2023  
INVENTOR(S) : Olivier Van Nieuwenhuyze Page 1 of 1

It is certified that error appears in the above-identified patent and that said Letters Patent is hereby corrected as shown below:

In the Claims

Column 13, Claim 15, Line 26:
"plurality of operating." should read: --plurality of operating systems.--

Signed and Sealed this
Seventh Day of November, 2023

Katherine Kelly Vidal
*Director of the United States Patent and Trademark Office*